United States Patent
Saha et al.

[11] Patent Number: 5,332,645
[45] Date of Patent: Jul. 26, 1994

[54] LOW DUSTING CARRIERS

[75] Inventors: Bijay S. Saha; James H. Anderson, both of Rochester, N.Y.

[73] Assignee: Eastman Kodak Company, Rochester, N.Y.

[21] Appl. No.: 952,250

[22] Filed: Sep. 28, 1992

[51] Int. Cl.⁵ .............................................. G03G 5/00
[52] U.S. Cl. .................................. 430/137; 430/108; 430/106.6; 427/221
[58] Field of Search ............. 430/108, 137, 106.6; 427/221

[56] References Cited

U.S. PATENT DOCUMENTS

| | | | |
|---|---|---|---|
| 3,053,770 | 9/1962 | Counts | 252/62.5 |
| 3,629,118 | 12/1971 | Isserlis | 252/62.54 |
| 3,839,029 | 10/1974 | Berg et al. | 252/62.1 |
| 3,914,181 | 10/1975 | Berg et al. | 252/62.1 |
| 4,493,874 | 1/1985 | Kubo et al. | 428/403 |
| 4,546,060 | 10/1985 | Miskinis et al. | 430/108 |
| 4,623,603 | 11/1986 | Iimura et al. | 430/108 |
| 4,764,445 | 8/1988 | Miskinis et al. | 430/108 |
| 4,822,708 | 4/1989 | Machida et al. | 430/108 |
| 5,061,586 | 10/1991 | Saha et al. | 430/108 |
| 5,096,797 | 3/1992 | Yoerger | 430/108 |

Primary Examiner—Steve Rosasco
Attorney, Agent, or Firm—Willard G. Montgomery

[57] ABSTRACT

A method of manufacturing improved strontium or barium ferrite carrier particles for use in two-component electrographic developer compositions for the development of electrostatic charge patterns is provided in which the tendency toward early life dusting of the strontium or barium ferrites is reduced.

Such strontium or barium ferrite carrier particles are obtained by (i) mixing unreacted particles of iron oxide and barium or strontium oxide or, alternatively, a salt of barium or strontium convertible to the corresponding oxide by heat upon subsequent firing in a mole ratio of iron oxide to the metal oxide or salt of exactly 5.95 to 6.0:1 with an organic binder and a polar solvent, preferably water, to form a slurry, (ii) spray drying the slurry to obtain green beads of substantially uniform particle size and substantially spherical shape, and (iii) firing the beads at a temperature of from 1150° to 1175° C. for 10 hours to form magnetic strontium or barium ferrite carrier particles of substantially uniform particle size and substantially spherical shape having a reduced tendency towards early life dusting.

15 Claims, No Drawings

LOW DUSTING CARRIERS

FIELD OF THE INVENTION

This invention relates to electrography and, more particularly, to a method for improving the performance of carrier particles for use in magnetic brush dry development of electrostatic charge images.

BACKGROUND

The term "electrography" and "electrographic" as used herein broadly include various processes that involve forming and developing electrostatic charge patterns on surfaces, with or without the use of light. They include electrophotography and other processes. One method of electrographic development is the magnetic brush method which is widely used for dry development in electrophotographic document copying machines. It is disclosed, for example, in U.S. Pat. No. 3,003,462. The method of the present invention is useful in preparing the carrier particles for two-component dry developers used in the magnetic brush method. Such a developer is a mixture of thermoplastic toner particles and magnetic carrier particles, the latter being partially coated with an insulating resin.

In the development station of a copying machine, the two-component developer, which includes the magnetic carrier particles, is attracted to a magnetic brush consisting of stationary magnets surrounded by a rotating cylindrical sleeve or a stationary sleeve surrounding rotating magnets, e.g., as in the patent to Miskinis et al., U.S. Pat. No. 4,546,060. By frictional contact with the resin-coated carrier particles, the toner particles are triboelectrically charged and cling to the carrier particles, creating bristle-like formations of developer on the magnetic brush sleeve. In developing a charge pattern, the brush is brought close to the charged surface. The oppositely charged toner particles are drawn away from the carrier particles on the magnetic brush by the more strongly charged electrostatic charge pattern, thus developing and making visible the charge pattern.

Although uncoated iron particles have been used as carriers in magnetic brush developers and although the high conductivity of uncoated iron particles is desirable because a conductive magnetic brush serves as a development electrode and improves the development of large solid areas in the image, nevertheless, resin-coated carrier particles have been preferred. One reason for resin-coating the carrier particles has been to improve the triboelectric charging of the toner particles. When a resin-coated carrier is used, the toner powder acquires an optimally high, net electrical charge because of the frictional contact of the toner particles and the resin coating. The high net charge reduces the amount of toner lost from the developer mix as it is agitated in the magnetic brush apparatus.

Especially useful as the carrier particles in two component developers are strontium and barium ferrites. Ferrites, as used herein, are magnetic oxides containing iron as a major metallic component. The ferrites of strontium and barium referred to herein are the ferrites of strontium and barium, having the formula $BaFe_{12}O_{19}$ and $SrFe_{12}O_{19}$. These ferrite carriers are disclosed in U.S. Pat. No. 4,546,060 to Miskinis et al and U.S. Pat. No. 4,764,445 to Saha, both of which are incorporated herein by reference. Strontium and barium ferrites, being hard magnetic materials, are desirable as carrier particles. The use of such "hard" magnetic materials which exhibit a coercivity of at least 300 Oersteds when magnetically saturated and an induced magnetic moment of at least 20 EMU/g when in an applied magnetic field of 1000 Oersteds as carrier particles has been found to dramatically increase the speed of development when compared to conventional magnetic carriers made of relatively "soft" magnetic materials such as magnetite, pure iron, ferrite or a form of $Fe_3O_4$ having magnetic coercivities of about 100 gauss or less.

However, a problem that has been encountered with magnetic ferrite carrier particles containing strontium and barium has been the contamination of the carrier particles with dust or fines in the form of strontium or barium oxides. When such a carrier is mixed with toner powder to form the two-component developer mixture, this dust deposits on the surfaces of the toner particles and reduces their ability to develop an electrostatic charge. An indication of such contamination is toner "throw-off" during the development process. Throw-off is the term used to describe toner particles that separate from the carrier before they are attracted to the more strongly charged photoconductor. This phenomena may also be described as "early life dusting".

Minimum, or more preferably, zero, "early life dusting" is one of the most important requirements of electrographic developer compositions so that contamination problems caused by airborne toner dust in the development apparatus along with the additional imaging problems such as unwanted background and scumming of the electrostatic image-bearing elements caused by toner throw-off are avoided. Therefore, it is very important to eliminate or significantly reduce the problem of "early life dusting".

In the past, one way of overcoming this problem has been to precondition the developer. This is done by agitating or "exercising" the developer mixture for a period of time before it is used for electrostatic image development and stripping off the contaminated toner particles. However, a problem can result from this technique in that the resinous toner particles tend to scum the carrier or pack into its pores. When this happens the capability of the carrier for triboelectric charging of the toner particles is adversely affected.

Recently, a technique was described in U.S. Pat. No. 5,096,797 to Yoerger for obviating this problem. The technique described in the patent to Yoerger comprises washing the magnetic strontium ferrite and barium ferrite carrier particles with an aqueous acid solution to remove dust or fines in the form of strontium or barium oxides from the carrier particles.

Unfortunately, this technique requires the use of acid solutions containing such acids as hydrochloric acid, sulfuric acid, nitric acid, hydrofluoric acid, phosphoric acid, acetic acid, oxalic acid, citric acid and mixtures thereof which create undesirable handling and disposal problems which in turn add to the overall cost of producing the carrier particles.

We have found that the prior art limitations of preconditioning and acid treatment can be effectively and easily overcome in the following manner.

In the conventional carrier manufacturing process for producing strontium and barium ferrite carrier particles of the formula $MO.6Fe_2O_3$ where M is barium or strontium, powders of ferric oxide (i.e., $Fe_2O_3$) and the oxides of barium or strontium or a salt of barium or strontium convertible to the oxide by heat such as the carbonates, sulfates, nitrates or phosphates of barium or strontium are mixed together in a predetermined ratio, typically from about 4 to 6 moles of $Fe_2O_3$ per 1 mole of the metal oxide or metal oxide forming salt. This mixture of ferrite-forming precursor materials or particles is then mixed with a solution of an organic binder, such as guar gum, and a polar solvent, preferably water, ball milled into a liquid slurry and then spray dried to form unreacted, nonmagnetic, dried green beads. Spray drying is the most commonly used technique to manufacture green beads. This technique is described in K. Masters, "Spray Drying Handbook", George Godwin Limited, London, 1979, which is hereby incorporated by reference. Guar gum is a natural product which has been widely used in industry because it is inexpensive, non-toxic, soluble in water and generally available. It also undergoes nearly complete combustion in the subsequent firing stage, leaving little residue in the magnetic ferrite carrier particles. Upon evaporation, these droplets form individual green beads of substantially uniform particle size and substantially spherical shape.

During the ball milling process, a liquid slurry is produced that has chemical homogenity and an optimum particle size of the constituent raw materials. During spray drying, the solvent (e.g., water) in the liquid droplet is evaporated. In the dried droplet, the organic binder acts to bind the constituent ferrite-forming materials or particles together.

In order to prepare the magnetic carrier particles, the green beads are subsequently cured or fired at high temperatures, generally ranging from about 900° to 1500° C. During the firing process, the individual particulates within the individual green beads react to produce the desired crystallographic phase. Thus, during the firing process, the individual unreacted ferrite-forming precursor components bound in the nonmagnetic green bead react to form the magnetic carrier particles, which, like the green beads are of substantially uniform particle size and substantially spherical shape. The organic binder is degraded and is not present in the magnetic carrier particles. The magnetic character of the carrier particle is controlled by the chemical stoichiometry of the constituting ferrite-forming materials and the processing conditions of reaction time and temperature. For optimum carrier performance, it is important that the chemical composition of the green beads be maintained throughout the spray drying process. The disintegration of green beads can result in chemically heterogeneous green particles, which will lead to less than optimum chemical reactions during the firing process, and inferior magnetic performance of the final product.

SUMMARY OF THE INVENTION

In accordance with the present invention, we have found that reduction in the charging capabilities of the magnetic ferrite carrier particles and hence "early life dusting" can be substantially reduced or substantially eliminated by maintaining the mole ratio of $Fe_2O_3$ to the barium or strontium oxide components or the barium or strontium salt components convertible to the corresponding oxide upon subsequent firing present in the ferrite-forming mixture at exactly 5.95–6.0:1 and by curing or firing the unreacted, dried green beads resulting from the spray drying step of the carrier manufacturing process at a temperature of precisely 1150° to 1175° C. for a period of time 10 hours.

Accordingly, there is now provided a method of producing hard magnetic strontium or barium ferrite carrier particles of substantially uniform particle size and substantially spherical shape suitable for magnetic brush development of electrostatic change patterns and having a reduced tendency towards early life dusting which comprises:

(i) mixing unreacted particles of $Fe_2O_3$ and unreacted particles of barium or strontium oxide or a metal salt of barium or strontium convertible to the corresponding oxide upon subsequent firing in a mole ratio of $Fe_2O_3$ to the metal oxide or salt of 5.95 to 6.0:1 with an organic binder and water, as a solvent, to form a slurry;

(ii) spray drying the slurry to obtain green beads of substantially uniform particle size and substantially spherical shape, and (iii) firing the beads at a temperature ranging from 1150° to 1175° C. for a period of time of 10 hours to obtain hard magnetic ferrite carrier particles of substantially uniform particle size and substantially spherical shape having a reduced tendency towards early life dusting.

In another embodiment of the invention, there is provided a method of forming an electrographic developer composition suitable for magnetic brush development of electrostatic charge patterns containing hard magnetic strontium or barium ferrite carrier particles of substantially uniform particle size and substantially spherical shape which comprises:

(i) mixing unreacted particles of $Fe_2O_3$ and unreacted particles of barium or strontium oxide or a salt of barium or strontium convertible to the corresponding metal oxide upon subsequent firing in a mole ratio of $Fe_2O_3$ to the metal oxide or salt of 5.95 to 6.0:1 with an organic binder and water, as a solvent, to form a slurry;

(ii) spray drying the slurry to obtain green beads of substantially uniform particle size and substantially spherical shape, and (iii) firing the beads at a temperature ranging from 1150° to 1175° C. for a period of time of 10 hours to obtain hard magnetic ferrite carrier particles of substantially uniform particle size and substantially spherical shape and thereafter (IV) mixing the hard magnetic strontium or barium ferrite carrier particles with finely-divided toner particles and obtaining a developer composition having a reduced tendency towards early life dusting.

In still another embodiment of the present invention, there is provided an electrographic developer mixture suitable for magnetic brush development of electrostatic charge patterns having a reduced tendency towards early life dusting comprising finely-divided toner particles and hard magnetic strontium or barium ferrite carrier particles of substantially uniform particle size and substantially spherical shape, said carrier particles having been produced by:

(i) mixing unreacted particles of $Fe_2O_3$ and unreacted particles of barium or strontium oxide or a salt of barium or strontium convertible to the corresponding metal oxide upon subsequent firing in a mole ratio of $Fe_2O_3$ to the metal oxide or salt of 5.95 to 6.0:1 with an organic binder and water, as a solvent, to form a slurry;

(ii) spray drying the slurry to obtain green beads of substantially uniform particle size and substantially spherical shape, and (iii) firing the beads at a temperature ranging from 1150° to 1175° C. for a period of time of 10 hours to obtain hard magnetic ferrite carrier particles of substantially uniform particle size and substantially spherical shape.

DESCRIPTION OF THE PREFERRED EMBODIMENTS

As previously mentioned, the electrographic developer carriers which are made by the method of this invention are strontium or barium ferrites. Ferrites, as used herein, are magnetic oxides containing iron as a major metallic component.

Strontium and barium ferrites, being hard magnetic materials, are desirable as carrier particles. In their manufacture, however, a substantial amount of dust in the form of strontium or barium oxides, forms on the surface of the ferrite carrier. It is the prevention or substantial reduction of the formation of this strontium or barium oxide dust with which the present invention is concerned.

Although the method of the present invention is suitable for treating bare carrier particles, it is especially effective on carrier particles that have been resin-coated to improve the triboelectric charging of the toner particles.

The resin with which the carrier particles are coated can be any of a large class of thermoplastic polymeric resins. Especially desirable are fluorocarbon polymers such as poly(vinylidene fluoride) and poly(vinylidene fluoride-co-tetra-fluoroethylene). Also useful are the copolymers of vinylidene chloride with acrylic monomers which are disclosed in U.S. Pat. No. 3,795,617. Other examples include cellulose esters such as cellulose acetate and cellulose acetate butyrate, polyesters such as poly(ethylene terephthalate) and poly(1,4-butanediol terephthalate), polyamides such as nylon and polycarbonates, polyacrylates and polymethacrylates. Still other examples include the thermosetting resins and light-hardening resins described in U.S. Pat. No. 3,632,512; the alkali-soluble carboxylated polymers of U.S. Pat. No. Re. 27,912 (Reissue of U.S. Pat. No. 3,547,822); and the ionic copolymers of U.S. Pat Nos. 3,795,618 and 3,898,170.

The ferrite carrier particles used in two-component developers normally are of larger size than the toner particles. They have, for example, an average diameter from 5 to 500 micrometers, preferably from 5 to 100 micrometers and most preferably, 5 to 60 micrometers.

In coating the ferrite carrier particles with resin the carrier particles are mixed with finely-divided powdered resin. The particle size of the powdered resin can vary considerably but should be smaller than the particle size of the carrier particles. The resin particles can range in average diameter from 0.01 to 50 micrometers although a particle size from 0.05 to 10 micrometers is preferred.

The amount of resin powder relative to the amount of carrier particles can vary over a considerable range, but preferably, is from 0.05 to 5 weight percent. By using such a small amount of resin it is possible to form a discontinuous resin coating or a very thin resin coating on the ferrite particles and retain good conductivity in accordance with the invention.

To dry-mix the carrier particles and resin particles, they preferably are tumbled together in a rotating vessel. This dry mixing should continue preferably for several minutes, e.g., for 5 to 30 minutes. Other methods of agitation of the particles are also suitable, e.g., mixing in a fluidized bed with an inert gas stream, or mixing by a mechanical stirrer.

After dry mixing the carrier particles and resin powder as described, the resin is bonded to the carrier particles, for example, by heating the mixture in an oven at a temperature and for a time sufficient to achieve bonding.

The magnetic strontium and barium ferrite electrographic developer carriers of the invention are prepared by forming a mixture of unreacted particles of $Fe_2O_3$ and unreacted particles of barium or strontium oxide or a salt of barium or strontium convertible to the oxide by heat such as the carbonates, sulfates, nitrates or phosphates of barium or strontium at a mole ratio of $Fe_2O_3$ to the metal oxide or metal salt of exactly 5.95–6.0:1, mixing the ferrite-forming mixture thus formed with an organic binder, such as guar gum, and a polar solvent, preferably water, spray drying the mixture, for example, in a Niro Atomizer or Niro Spray Dryer according to the method described in K. Masters, "Spray Drying Handbook", George Godwin Limited, London, 1979, to remove the solvent and form a fine, dry particulate of green beads of substantially uniform particle size and substantially spherical shape and then firing the beads at a temperature of from exactly 1150° to 1175° C. for a period of time of 10 hours to obtain the magnetic strontium and ferrite developer carriers of the invention. We have found that by maintaining the mole ratio of $Fe_2O_3$ to the metal oxide or metal salt component in the ferrite-forming mixture at exactly 5.95–6.0:1 and by firing the green beads at a temperature of 1150° to 1175° C. for a period of time of 10 hours that an extremely clean ferrite carrier is created which is free of dust in the form of strontium or barium oxides on the surface of the ferrite carrier. Thus, a clean strontium or barium ferrite carrier is produced which is free from the toner scumming that would otherwise occur in a developer preconditioning step and can therefore create an optimally high triboelectric charge and produce very little toner "throw-off" when used. In addition, the acid wash treatment of the prior art is avoided along with the undesirable and costly handling and disposal problems associated with the acid wash procedure.

Further, the strontium and barium ferrite carrier particles produced by the process of the present invention also possess the high magnetic properties of coercivity and induced magnetic moment (i.e., a coercivity of at least 300 Oersteds when magnetically saturated and an induced magnetic moment of at least 20 EMU/GM when in an applied field of 1000 Oersteds required to develop electrostatic charge patterns at high-volume copying rates when employed in electrostatographic development processes and to produce high quality images.

As was discussed previously, during the ball milling process, a liquid slurry is produced which has chemical homogeneity and an optimum particle size of the constituent raw ferrite-forming materials. During the spray drying, the solvent (e.g., water) in the liquid droplet is evaporated. In the dried droplet, the organic binder acts to bind the constituent ferrite-forming particles together.

In order to keep the particles or powders well suspended in the aqueous media containing the organic binder, a small amount of a surfactant, such as ammonium polymethacrylate or sodium polymethacrylate is typically added to the aqueous media. The concentration of the surfactant may be varied from about 0.02 to about 0.04 percent by weight of the ferrite-forming solids in the slurry.

During firing, the individual particulates within the green beads react to produce the magnetic carrier particles which, like the green beads are of substantially uniform particle size and substantially spherical shape. The organic binder is degraded and is not present in the magnetic carrier particles.

We have found that ferrites made from ferrite-forming precursors, e.g., strontium carbonate and iron oxide mixed beyond the exact ratio of 5.95–6.00:1 is undesirable due to the fact that formation of impurity phases is more probable. Likewise, impurity phases are formed at ratios below 4.75. For large scale processing a ratio of 5.95 is more suitable than 6.00, since it allows a margin of 0.05 in stoichiometry to prevent the formation of impurity phases due to the inadequate homogenity, which may occur in a large scale manufacturing.

The firing of spray dried green beads is critical. An excessively high heat load alters the ferrite crystallographic structure, which influences the magnetic properties. A lower than adequate temperature produces an unreacted or partially reacted ferrite carrier core, which has undesirable characteristics. The useful heat load remains in the temperature range of 1150° to 1175° C. based upon the soak time of 10 hours. Temperatures above the upper end of this temperature range are undesirable for xerographic applications, although temperatures of from approximately 1275° to 1400° C. are suitable for ferrite powder for the production of permanent magnets and is widely used in the ferrite powder industry. The appropriate temperature range for xerographic properties is from 1150° to 1175° C. A heat load in this temperature range guarantees enough thermal energy to complete the solid state reaction while preventing the sintering of the individual particles. Sintering of the individual particles is to be avoided as it precludes the formation of magnetic ferrite carrier particles of substantially uniform particle size and substantially spherical shape. In an ideal case, the powder needs to be well reacted but not sintered at all.

The stoichiometric ratio of 5.95–6.0:1 also operates to prevent the sintering of individual particles during the firing step. That is, given the same heat load, a stoichiometric ratio of ferrite-forming powders below 5.95 to 6.0:1 (e.g., 5.00 to 5.80:1) exhibits a higher sintering propensity than ferrite-forming powders having a stoichiometric ratio of 5.95 to 6.0:1. One method of measuring the sintering propensity of the ferrite-forming powders is the ferrite cake fracture compressive load test described in ASTM C 773-82. Low temperature (i.e., 1150° to 1175° C.) and high stoichiometry (i.e., 5.95 to 6.0:1) reactions yield a compressive load in the range of 100 to 300 psi, whereas high temperature (i.e., above 1175° C.) and low stoichiometry (i.e., below 5.95 to 6.0:1) reactions result in a compressive load the range of 3000 to 5000 psi. A low compressive load is indicative of little or no sintering of the individual particulates within the spray dried green beads. The most desirable powder properties are obtained when the stoichiometric ratio of $Fe_2O_3$ to the strontium or barium oxides or salts is 5.95 to 6.00:1 and the processing is carried out in the temperature range of 1150° to 1175° C.

Although a ball milling device which utilizes stainless steel balls is preferred in carrying out the method of the present invention, the ferrite-forming starting materials may be mixed in slurry form in any one of the following types of equipment such as a vibrating pebble mill, a high speed stirrer with counter turning rotor blades, an impeller mixture, a high speed dispersator, a high speed mixer or other conventional mixing equipment in lieu of a ball milling device. The actual degree of mixing achieved may be controlled by the choice of equipment used and selection of specific equipment operating parameters and/or slurry conditions such as mixing speed, mixing time, viscosity and temperature. Where it is desired to obtain controlled particle size reduction during the mixing operation, then the choice of equipment will generally predominate. In the case of a ball milling device, a smooth, homogeneous slurry is generally formed after approximately 12 hours of agitation depending on the equipment capacity and the size of the batch prepared. Following the slurry operation, it is generally preferred to screen the slurries prior to spray drying in order to eliminate any large, solid particles which may be present as would plug the atomizer.

A spray dryer designed for either spray nozzle atomization of spray machine-disc atomization or equivalent may be employed to dry the slurry of ferrite-forming starting materials. A particularly desirable type of spray machine is one that is essentially a closed pump impeller driven by a variable speed drive and is commonly termed a spinning atomizer, disc or wheel. A Niro Atomizer or Niro Spray Dryer (disc type) is especially useful. The total system generally consists of a power-coolant-lubrication console, power cables, fluid transport hoses, and a variable speed motor drive with closed impeller. The high speed impeller uses the energy of centrifugal force to atomize the slurry. The particle size distribution obtained with this spray machine is generally narrow. In addition product characteristics may be varied by the spinning atomizer design, speed and position in the chamber relative to air entrance. Preferably, when employing the spinning atomizer, the spray dryer should have a large diameter configuration to avoid sticking of the atomized ferrite-forming precursor particles to the dryer chamber walls. Slurries of ferrite-forming particles may be atomized using two-fluid nozzles where the atomizing force is pressured air, single-fluid pressure nozzles where the atomizing force is the pressure of the slurry itself released through an orifice, and centrifugal atomization by spinning wheel or other suitable atomization method. The atomizing pressures, or the speed of rotation in the case of wheel atomization, and the slurry feed rates may be varied as a partial control of particle size. It is also possible to control the particle size of the spray dried ferrite-forming beads by varying the percentage of solids in the feed slurry. The atomizing force and feed rate should be adjusted to the configuration, size and volumetric air flow of a given drying chamber in order that atomized particles do not contact drying chamber surfaces while still wet. In accordance with the method of this invention, the percentage of solids in the feed slurry may be varied from about 30 to about 50 percent by weight of the ferrite-forming precursor materials slurried in the liquid medium. As previously discussed, a surfactant material, such as ammonium polymethacrylate or sodium polymethacrylate is typically added to the slurry. The concentration of the surfactant may be varied from about 0.02 to about 0.04 percent by weight of the ferrite-forming solids in the slurry. Although considerable latitude exists in regard to the ferrite-forming particle sizes employed for the slurry, particles having an average particle size less than about 5 micrometers, preferably from 0.5 to 1 micrometer are preferred to avoid high settling rates in the slurry. The spray dried ferrite-forming beads may be collected in drying chambers of suitable size. Spray dried beads have been collected in a chamber 30 inches in diameter and 5 feet in height, with volumetric air flow of 250 cfm. With a system of this type, a product collection rate of about 30 pounds per hour may be maintained. Both types of dryer systems will produce a spray dried product in the size range for a particular electrostatographic use, for example, on the order of 5 to 500 micrometers. In addition, both co-current and counter-current drying systems yield satisfactory products. The temperature of the drying air may be varied from about 150° to about 200° C. at the inlet and from about 50° to about 100° C. at the outlet with satisfactory results. Atomizing pressures typically range from about 20 to 30 psi.

Any suitable type of sintering furnace may be employed in the sintering step of the process of this invention. Typical sintering furnaces include a static furnace, a rotary kiln, or an agitated bed furnace. The static furnace type will generally provide for long residence times. The rotary kiln type of sintering furnace generally provides uniform product reaction, consistent residence time and high capacity throughput. When employing a rotary kiln sintering furnace, a special media such as a flow promoting ingredient for example, aluminum oxide, zirconium oxide, or other materials may be added in combination with the ferrite-forming precursor beads to minimize or avoid bead-to-bead agglomeration and bead to furnace wall sticking. Preferably, the flow promoting ingredient is approximately the same size as the spray dried beads because bead-to-bead agglomeration and bead to furnace wall sticking is substantially eliminated. Thus, if the spray dried beads are about 100 microns, the flow promoting ingredient should also be about 100 microns. Further, such a flow promoting ingredient may also influence the electrostatographic properties of the ferrite carrier material. In addition, to further avoid or minimize bead sticking to rotary furnace walls a scraping device may be employed individually or in combination with the flow promoting ingredient. In any event, the sintering of the ferrite-forming beads should be under controlled conditions as to preserve the shape and particular nature of the beads while providing a uniform furnace residence time to produce maximum bead uniformity and desired properties.

Firing of the ferrite-forming spray dried beads at elevated temperatures to induce reaction of the ferrite-forming components is carried out at temperatures of from 1150° to 1175° C. for a period of time of 10 hours. As mentioned previously, this combination of reaction temperature and reaction time along with maintaining the mole ratio of $Fe_2O_3$ to the strontium or barium metal oxides or salts in the ferrite-forming mixture of starting materials exactly at 5.95 to 6.0:1 provides a strontium or barium ferrite carrier material substantially devoid of unwanted surface dust in the form of strontium or barium oxides on the ferrite carrier which in turn reduces or substantially eliminates "early life dusting".

Any suitable size of sintering furnace may be employed in the sintering step of the process of this invention. Static furnaces are preferred because they generally provide a consistent residence time, uniformity of product reaction, and high capacity throughput.

If desired, binder materials other than guar gum or gum Arabic such as polyvinyl alcohol, dextrin, lignosulfonate and methyl cellulose can be used in the practice of the present invention.

The magnetic carrier particles produced by the method of this invention are combined with powdered toner particles to form two-component developer compositions that have a much reduced tendency toward early life dusting.

In use, the toner particles are electrostatically attracted to the electrostatic charge pattern on an element while the carrier particles remain on the applicator shell or sleeve. This is accomplished in part by intermixing the toner and carrier particles so that the carrier particles acquire a charge of one polarity and the toner particles acquire a charge of the opposite polarity. The charge polarity on the carrier is such that it will not be electrically attracted to the electrostatic charge pattern. The carrier particles also are prevented from depositing on the electrostatic charge pattern because the magnetic attraction exerted between the rotating core and the carrier particles exceeds the electrostatic attraction which may arise between the carrier particles and the charge image.

Tribocharging of toner and hard magnetic carrier is achieved by selecting materials that are so positioned in the triboelectric series to give the desired polarity and magnitude of charge when the toner and carrier particles intermix. If the carrier particles do not charge as desired with the toner employed, the carrier can be coated with a material which does. Such coating materials and methods have been previously described herein. The charging level in the toner is at least 5 microcoulombs per gram of toner weight. Charging levels from about 10 to 30 microcoulombs per gram of toner are preferred, while charging levels up to about 150 microcoulombs per gram of toner are also useful. At such charging levels, the electrostatic force of attraction between toner particles and carrier particles is sufficient to disrupt the magnetic attractive forces between carrier particles, thus facilitating replenishment of the developer with fresh toner. How these charging levels are measured is described below. The polarity of the toner charge, moreover, can be either positive or negative.

The charge-to-mass ratio on the toner, Q/M, in microcoulombs/gram, is measured using a standard procedure in which the toner and carrier are placed on a horizontal electrode beneath a second horizontal electrode and are subjected to both an AC magnetic field and a DC electric field. When the toner jumps to the other electrode change in the electric charge is measured and is divided by the weight of toner that jumped. It will be appreciated, in this regard, that the carrier will bear about the same charge as, but opposite in polarity to, that of the toner.

The developer is formed by mixing the particles with toner particles in a suitable concentration. Within developers of the invention, high concentrations of toner can be employed. Accordingly, the present developer preferably contains from about 70 to 99 weight percent carrier and about 30 to 1 weight percent toner based on the total weight of the developer; most preferably, such concentration is from about 75 to 99 percent carrier and from about 25 to 1 weight percent toner.

The toner component of the invention can be a powdered resin which is optionally colored. It normally is prepared by compounding a resin with a colorant, i.e., a dye or pigment, and any other desired addenda. If a developed image of low opacity is desired, no colorant need be added. Normally, however, a colorant is included and it can, in principle, be any of the materials mentioned in Colour Index, Vols. I and II, 2Nd Edition. Carbon black is especially useful. The amount of colorant can vary over a wide range, e.g., from 3 to 20 weight percent of the polymer. Combinations of colorants may be used.

The mixture is heated and milled to disperse the colorant and other addenda in the resin. The mass is cooled, crushed into lumps and finely ground. The resulting toner particles range in diameter from 0.5 to 25 micrometers with an average size of 1 to 16 micrometers. Preferably, the average particle size ratio of carrier to toner lie within the range from about 15:1 to about 1:1. However, carrier-to-toner average particle size ratios of as high as 50:1 are also useful.

The toner resin can be selected from a wide variety of materials, including both natural and synthetic resins and modified natural resins, as disclosed, for example, in the patent to Kasper et al, U.S. Pat. No. 4,076,857 issued Feb. 28, 1978. Especially useful are the crosslinked polymers disclosed in the patent to Jadwin et al, U.S. Pat. No. 3,938,992 issued Feb. 17, 1976, and the patent to Sadamatsu et al, U.S. Pat. No. 3,941,898 issued Mar. 2, 1976. The crosslinked or noncrosslinked copolymers of styrene or lower alkyl styrenes with acrylic monomers such as alkyl acrylates or methacrylates are particularly useful. Also useful are condensation polymers such as polyesters.

The shape of the toner can be irregular, as in the case of ground toners, or spherical. Spherical particles are obtained by spray drying a solution of the toner resin in a solvent. Alternatively, spherical particles can be prepared by the polymer bead swelling technique disclosed in European Pat. No. 3905 published Sep. 5, 1979, to J. Ugelstad.

The toner can also contain minor components such as charge control agents and antiblocking agents. Especially useful charge control agents are disclosed in U.S. Pat. No. 3,893,935 and British Pat. No. 1,501,065. Quaternary ammonium salt charge agents are disclosed in Research Disclosure, No. 21030, Volume 210, October, 1981 (published by Industrial Opportunities Ltd., Homewell, Havant, Hampshire, P09 1EF, United Kingdom), are also useful.

The following non-limiting examples further illustrate the method of the invention.

EXAMPLE 1

A carrier composition of the invention was prepared as follows:

Powders of strontium carbonate (49.21 grams) and iron oxide (319.38 grams) were mixed thoroughly in a glass container. The mole ratio of $Fe_2O_3$ to strontium carbonate was 6.0:1. In a separate container, a stock solution was prepared by dissolving 4.0 weight percent (based on the weight of the solution) of a binder resin, i.e., gum Arabic and 0.03 weight percent ammonium polymethacrylate surfactant (sold by W. R. Grace and Co. as "Daxad-32") in distilled water. The powders were mixed with the stock solution in a 1:1 weight ratio and the mixture was ball milled for approximately 24 hours in the presence of stainless steel balls as the milling media and then spray dried in a Niro Spray Dryer. The spray drying was carried out utilizing the following parameters:

| | |
|---|---|
| Inlet Temperature: | 150–200° C. |
| Outlet Temperature | 50–100° C. |
| Solution Flow: | 20–50 cc/min |
| Atomizer: | Standard Niro Atomizer |
| Speed: | 2000–4000 RPM |
| Atomizing Pressure: | 20–30 psi |

The green beads thus obtained were then fired at a temperature of 1150° C. for 10 hours to obtain strontium ferrite powder having a particle size range of 10 to 60 micrometers. The strontium ferrite carrier particles thus produced had an induced magnetic moment at 9000 Oersteds of 55 EMU/GM and a coercivity of 2874 Oersteds when magnetically saturated. The strontium ferrite particles were then coated with 1.0 part per hundred Kynar 301 fluorocarbon polymer (Pennwalt Chemical Company, King of Prussia, Pa.) which enabled the carrier to charge toner positively.

A developer composition was then prepared by mixing the carrier particles produced in accordance with the foregoing procedure with toner particles comprised of a black pigmented styrene butyl acrylate copolymer crosslinked with divinylbenzene. The toner particles ranged in size from 1 to 17 micrometers. The concentration of the toner was 10 percent by weight of the total developer. The charge-to-mass ratio of the toner (Q/M), determined as described above, ranged from 21 to 25 microcoulombs per gram of toner.

COMPARATIVE EXAMPLE 2

A carrier and developer composition outside the scope of the invention were prepared as a control in accordance with the following procedure.

Powders of strontium carbonate (49.21 grams) and iron oxide (302.88 grams) were mixed thoroughly in a glass container. The mole ratio of $Fe_2O_3$ to strontium carbonate was 5.69:1. In a separate container, a stock solution was prepared by dissolving 4.0 weight percent (based on the weight of the solution) of a binder resin, i.e., gum Arabic and 0.03 weight percent ammonium polymethacrylate surfactant (sold by W. R. Grace and Co. as "Daxad-32") in distilled water. The powders were mixed with the stock solution in a 1:1 weight ratio and the mixture was ball milled for approximately 24 hours in the presence of stainless steel balls as the milling media and then spray dried in a Niro Spray Dryer. The spray drying was carried out utilizing the following parameters:

| | |
|---|---|
| Inlet Temperature: | 150–200° C. |
| Outlet Temperature | 50–100° C. |
| Solution Flow: | 20–50 cc/min |
| Atomizer: | Standard Niro Atomizer |
| Speed: | 2000–4000 RPM |
| Atomizing Pressure: | 20–30 psi |

The green beads thus obtained were then fired at a temperature of 1150° C. for 10 hours to obtain strontium ferrite powder having a particle size range of 10 to 60 micrometers. The strontium ferrite carrier particles thus produced had an induced magnetic moment at 9000 Oersteds of 55 EMU/GM and a coercivity of 2857 Oersteds when magnetically saturated. The strontium ferrite particles were then coated with 1.0 part per hundred Kynar 301 fluorocarbon polymer (Pennwalt Chemical Company, King of Prussia, Pa.) which enabled the carrier to charge toner positively.

A developer composition was then prepared by mixing the carrier particles produced in accordance with the foregoing procedure with toner particles comprised of a black pigmented styrene butyl acrylate copolymer crosslinked with divinylbenzene. The toner particles ranged in size from 1 to 17 micrometers. The concentration of the toner was 10 percent by weight of the total developer. The charge-to-mass ratio of the toner (Q/M), determined as described above, ranged from 20 to 24 microcoulombs per gram of toner.

COMPARATIVE EXAMPLE 3

A carrier and a developer composition outside the scope of the invention were prepared as a control by repeating the procedure described in Example 2 with the exception that the green beads, as prepared and described in Example 2, were fired at 1250° C. for 10 hours.

COMPARATIVE EXAMPLE 4

A carrier and a developer composition outside the scope of the invention were prepared as a control by repeating the procedure described in Example 1 with the exception that the green beads, as prepared and described in Example 1, were fired at 1250° C. for 10 hours.

EXAMPLE 5

The developers prepared in accordance with the procedures set forth in Examples 1-4 were tested for toner throw-off, which is indicative of early life dusting. In the test, the developer prepared at an initial toner concentration of 10 weight percent was aged from 0 to 60 minutes by tumbling 1 gram of the developer in a 4 dram screw-cap vial placed in the rotating magnetic field (2000 RPM, core rotation only) of a magnetic brush developing station. The developer at 10 weight percent toner concentration was then replenished with fresh toner to give a 15.0 weight percent toner concentration. The developer thus produced was transferred onto the magnetic brush which was surrounded by and enclosed within a concentric sleeve. During the rotation of the magnetic brush at 2000 RPM, any toner which left the developer mixture was deposited on the inner surface of the concentric sleeve which encapsulated the magnetic brush. Measurements of the amount of toner deposited on the inner surface of the sleeve were taken after each of the developers which were being tested had been rotated on the magnetic brush for 5 seconds. The difference in the weight of the sleeve before and after each measurement provided the mass of deposited toner. The toner mass is referred to as the "toner throw-off" number. The developer quality is estimated by the throw-off number. A high throw-off number at low aging time indicates a poor developer; conversely, a good developer is one which provides a low throw-off number after prolonged aging. The throw-off numbers for the developers of Examples 1-4 are set forth in the table below.

TABLE

| Aging Time (minutes) | Example 1 Throw-off Milli-gram | Example 2 Throw-off Milli-gram | Example 3 Throw-off Milli-gram | Example 4 Throw-off Milli-gram |
| --- | --- | --- | --- | --- |
| 0 | 0.1 | 0.5 | 0.7 | 0.2 |
| 1 | 0.2 | 1.3 | 1.4 | 0.2 |
| 2 | 0.2 | 6.9 | 7.6 | 0.2 |
| 5 | 0.8 | 27.5 | 35.5 | 5.5 |
| 10 | 1.2 | 46.5 | 48.5 | 35.5 |
| 20 | 3.4 | 110 | 123 | 85 |
| 50 | 4.5 | — | — | — |

As shown in the table, the data establishes that while the net charge on the toner in each case is substantially the same, the throw-off is significantly higher when the control carriers are used as compared to the carriers prepared in accordance with the method of the invention.

Barium ferrite compositions achieve similar results when used as electrographic carrier materials.

The invention has been described in detail with particular reference to preferred embodiments thereof, but it will be understood that variations and modifications can be effected within the spirit and scope of the invention.

We claim:

1. A method of producing hard magnetic strontium or barium ferrite carrier particles of substantially uniform particle size and substantially spherical shape suitable for magnetic brush development of electrostatic charge patterns and having a reduced tendency towards early life dusting which comprises:

(i) mixing unreacted particles of $Fe_2O_3$ and unreacted particles of barium or strontium oxide or a salt of barium or strontium convertible to the corresponding metal oxide upon subsequent firing in a mole ratio of $Fe_2O_3$ to the metal oxide or salt of 5.95 to 6.0:1 with an organic binder and water, as a solvent, to form a slurry;

(ii) spray drying the slurry to obtain green beads of substantially uniform particle size and substantially spherical shape, and (iii) firing the beads at a temperature ranging from 1150° to 1175° C. for a period of time of 10 hours to obtain hard magnetic ferrite carrier particles of substantially uniform particle size and substantially spherical shape having a reduced tendency toward early life dusting.

2. A method according to claim 1, wherein the organic binder is guar gum.

3. A method according to claim 1, wherein said barium salt is selected from the group consisting of barium carbonate, barium sulfate, barium nitrate and barium phosphate.

4. A method according to claim 1, wherein said strontium salt is selected from the group consisting of strontium carbonate, strontium sulfate, strontium nitrate and strontium phosphate.

5. A method according to claim 1, wherein the ferrite carrier particles are further characterized as being coated with a polymer comprising a poly(vinylidene fluoride) resin, a polymethacrylate resin, a polyacrylate or a polyester.

6. A method of forming an electrographic developer composition suitable for magnetic brush development of electrostatic charge patterns containing hard magnetic strontium or barium ferrite carrier particles of substantially uniform particle size and substantially spherical shape which comprises:

(i) mixing unreacted particles of $Fe_2O_3$ and unreacted particles of barium or strontium oxide or a salt of barium or strontium convertible to the corresponding metal oxide upon subsequent firing in a mole ratio of $Fe_2O_3$ to the metal oxide or salt of 5.95 to 6.0:1 with an organic binder and water, as a solvent, to form a slurry;

(ii) spray drying the slurry to obtain green beads of substantially uniform particle size and substantially spherical shape, and (iii) firing the beads at a temperature ranging from 1150° to 1175° C. for a period of time of 10 hours to obtain hard magnetic ferrite carrier particles of substantially uniform particle size and substantially spherical shape and thereafter (iv) mixing the hard magnetic strontium or barium ferrite carrier particles with finely-divided toner particles and obtaining a developer composition having a reduced tendency towards early life dusting.

7. A method according to claim 6, wherein the organic binder is guar gum.

8. A method according to claim 6, wherein said barium salt is selected from the group consisting of barium carbonate, barium sulfate, barium nitrate and barium phosphate.

9. A method according to claim 6, wherein said strontium salt is selected from the group consisting of strontium carbonate, strontium sulfate, strontium nitrate and strontium phosphate.

10. A method according to claim 6, wherein the ferrite carrier particles are further characterized as being coated with a polymer comprising a poly(vinylidene fluoride) resin, a polymethacrylate resin, a polyacrylate or a polyester.

11. An electrographic developer mixture suitable for magnetic brush development of electrostatic charge patterns having a reduced tendency towards early life dusting comprising finely-divided toner particles and hard magnetic strontium or barium ferrite carrier particles of substantially uniform particle size and substantially spherical shape, said carrier particles having been produced by:

(i) mixing unreacted particles of $Fe_2O_3$ and unreacted particles of barium or strontium oxide or a salt of barium or strontium convertible to the corresponding metal oxide upon subsequent firing in a mole ratio of $Fe_2O_3$ to the metal oxide or salt of 5.95 to 6.0:1 with an organic binder and water, as a solvent, to form a slurry;

(ii) spray drying the slurry to obtain green beads of substantially uniform particle size and substantially spherical shape, and (iii) firing the beads at a temperature ranging from 1150° to 1175° C. for a period of time of 10 hours to obtain hard magnetic ferrite carrier particles of substantially uniform particle size and substantially spherical shape.

12. A method according to claim 11, wherein the organic binder is guar gum.

13. A method according to claim 11, wherein said barium salt is selected from the group consisting of barium carbonate, barium sulfate, barium nitrate and barium phosphate.

14. A method according to claim 11, wherein said said strontium salt is selected from the group consisting of strontium carbonate, strontium sulfate, strontium nitrate and strontium phosphate.

15. A method according to claim 11, wherein the ferrite carrier particles are further characterized as being coated with a polymer comprising a poly(vinylidene fluoride) resin, a polymethacrylate resin, a polyacrylate or a polyester.

* * * * *